US007414239B2

(12) United States Patent
Shoji et al.

(10) Patent No.: US 7,414,239 B2
(45) Date of Patent: Aug. 19, 2008

(54) OPTICAL-SCANNING APPARATUS AND IMAGE FORMING APPARATUS

(75) Inventors: Katsunori Shoji, Chigasaki (JP); Takeshi Yamakawa, Chigasaki (JP); Hiroshi Yoshizawa, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/790,513

(22) Filed: Apr. 26, 2007

(65) Prior Publication Data

US 2007/0252077 A1 Nov. 1, 2007

(30) Foreign Application Priority Data

Apr. 27, 2006 (JP) ............................. 2006-123524
Apr. 27, 2006 (JP) ............................. 2006-123525

(51) Int. Cl.
*G02B 26/08* (2006.01)

(52) U.S. Cl. ....................... 250/236; 250/234; 347/261; 359/216

(58) Field of Classification Search ......... 250/234–236, 250/216; 347/243, 256, 260–261, 263; 359/196, 359/216, 220–221
See application file for complete search history.

(56) References Cited

U.S. PATENT DOCUMENTS

| | | | |
|---|---|---|---|
| 6,072,516 | A | 6/2000 | Yamakawa |
| 6,236,418 | B1 | 5/2001 | Yamakawa |
| 6,243,128 | B1 | 6/2001 | Yamakawa |
| 6,593,951 | B2 | 7/2003 | Yokoyama et al. |
| 6,829,001 | B2 | 12/2004 | Yamakawa |
| 7,057,780 | B2 | 6/2006 | Yoshizawa |
| 2005/0012974 | A1 | 1/2005 | Ono et al. |
| 2005/0052719 | A1 | 3/2005 | Tomita et al. |
| 2005/0231779 | A1 * | 10/2005 | Sowa et al. ................. 359/216 |
| 2005/0231780 | A1 * | 10/2005 | Kim ........................... 359/216 |
| 2006/0209376 | A1 | 9/2006 | Yamakawa et al. |
| 2007/0046766 | A1 | 3/2007 | Ono et al. |

FOREIGN PATENT DOCUMENTS

| | | |
|---|---|---|
| JP | 11-218710 | 8/1999 |
| JP | 2002-162585 | 6/2002 |
| JP | 2002-214558 | 7/2002 |
| JP | 2003-266787 | 9/2003 |

* cited by examiner

*Primary Examiner*—Kevin Pyo
(74) *Attorney, Agent, or Firm*—Harness, Dickey & Pierce, P.L.C.

(57) ABSTRACT

An optical-scanning apparatus is disclosed. In at least one embodiment, the optical-scanning apparatus includes a light deflector to deflect a beam from a light source; and an optical housing including a scanning-image optical system to focus the beam to scan a photo conductive photo receptor therewith as a light spot. The optical housing includes a collection member to collect particulate materials. The collection member includes a structure combining or overlapping plural sheet-shaped members, each including a highly-chargeable electrostatic absorption filter. Alternatively, the collection member includes an electrostatic absorption filter and a breathable sheet-shaped member covering almost all the surface of the electrostatic absorption filter.

20 Claims, 9 Drawing Sheets

OPTICAL-SCANNING APPARATUS AND IMAGE FORMING APPARATUS

PRIORITY STATEMENT

This patent application is based on, and hereby claims priority under 35 U.S.C. §119 on Japanese patent application Nos. 2006-123524 filed on Apr. 27, 2006 and 2006-123525 filed on Apr. 27, 2006, each filed in the Japan Patent Office, the entire contents of which each of which is hereby incorporated herein by reference.

BACKGROUND

1. Field

Embodiments of the present application generally relate to an optical-scanning apparatus and/or to an image forming apparatus using the optical-scanning apparatus. For example, they may relate to an optical-scanning apparatus deflecting a beam from a light source with a light deflector, focusing the beam with a scanning-image optical system installed at an optical housing, and scanning a photoconductive photoreceptor with the focused beam as a light spot.

2. Discussion of the Background

Recently, image forming apparatuses such as laser printers and digital copiers using the above-mentioned optical-scanning apparatus have come to be known well. Such an image forming apparatus uses, e.g., a polygon mirror 100 having the planar shape of an equilateral hexagon as shown in FIG. 15. The polygon mirror 100 rotates anticlockwise in the direction of an arrow, and there is a turbulence due to a negative-pressure of air then. The turbulence flings dusts and particulate materials in the air down to a part A behind each of the corners of the polygon mirror 100 to the rotation direction thereof, resulting in contamination of the part A. When the surface of the polygon mirror 100 is contaminated, a reflectance thereof deteriorates resulting in deterioration of image quality.

Japanese Patent No. 3652238 discloses a method of using a part B comparatively less contaminated instead of the part A to perform synchro detection for controlling irradiation timing in the main scanning direction.

Published Unexamined Japanese Patent Application No. 11-218710 discloses a method of discharging the polygon mirror so as not to attract dusts.

However, in the method disclosed in Japanese Patent No. 3652238, the contamination of the polygon mirror is inevitable as time passes, and cleaning or exchange thereof is needed. Further, the method disclosed in Published Unexamined Japanese Patent Application No. 11-218710 is insufficient because of not removing the cause of the contamination, but just attracting fewer dusts.

Because of these reasons, a need exists for an optical-scanning apparatus and an image forming apparatus wherein the contamination of polygon mirror can be largely reduced.

SUMMARY OF THE INVENTION

Accordingly, at least one embodiment of the present application provides an optical-scanning apparatus wherein the contamination of polygon mirror can be largely reduced.

At least one embodiment of the present invention provides an image forming apparatus using the optical-scanning apparatus.

In at least one embodiment of the present invention, an optical-scanning apparatus includes:

a light deflector to deflect a beam from a light source; and an optical housing including a scanning-image optical system to focus the beam to scan a photoconductive photoreceptor therewith as a light spot, wherein the optical housing includes a collection member to collect particulate materials, and wherein the collection member includes a structure combining plural sheet-shaped members, each including a highly-chargeable electrostatic absorption filter.

In addition, in at least one embodiment, an optical-scanning apparatus includes:

a light deflector to deflect a beam from a light source; and an optical housing including a scanning-image optical system to focus the beam to scan a photoconductive photoreceptor therewith as a light spot, wherein the optical housing includes a collection member to collect particulate materials, and wherein the collection member includes:

an electrostatic absorption filter; and a breathable sheet-shaped member to cover almost all the surface of the electrostatic absorption filter.

These and other features and advantages of embodiments of the present invention will become apparent upon consideration of the following description of the example embodiments of the present invention taken in conjunction with the accompanying drawings.

BRIEF DESCRIPTION OF THE DRAWINGS

Various other features and attendant advantages of embodiments of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
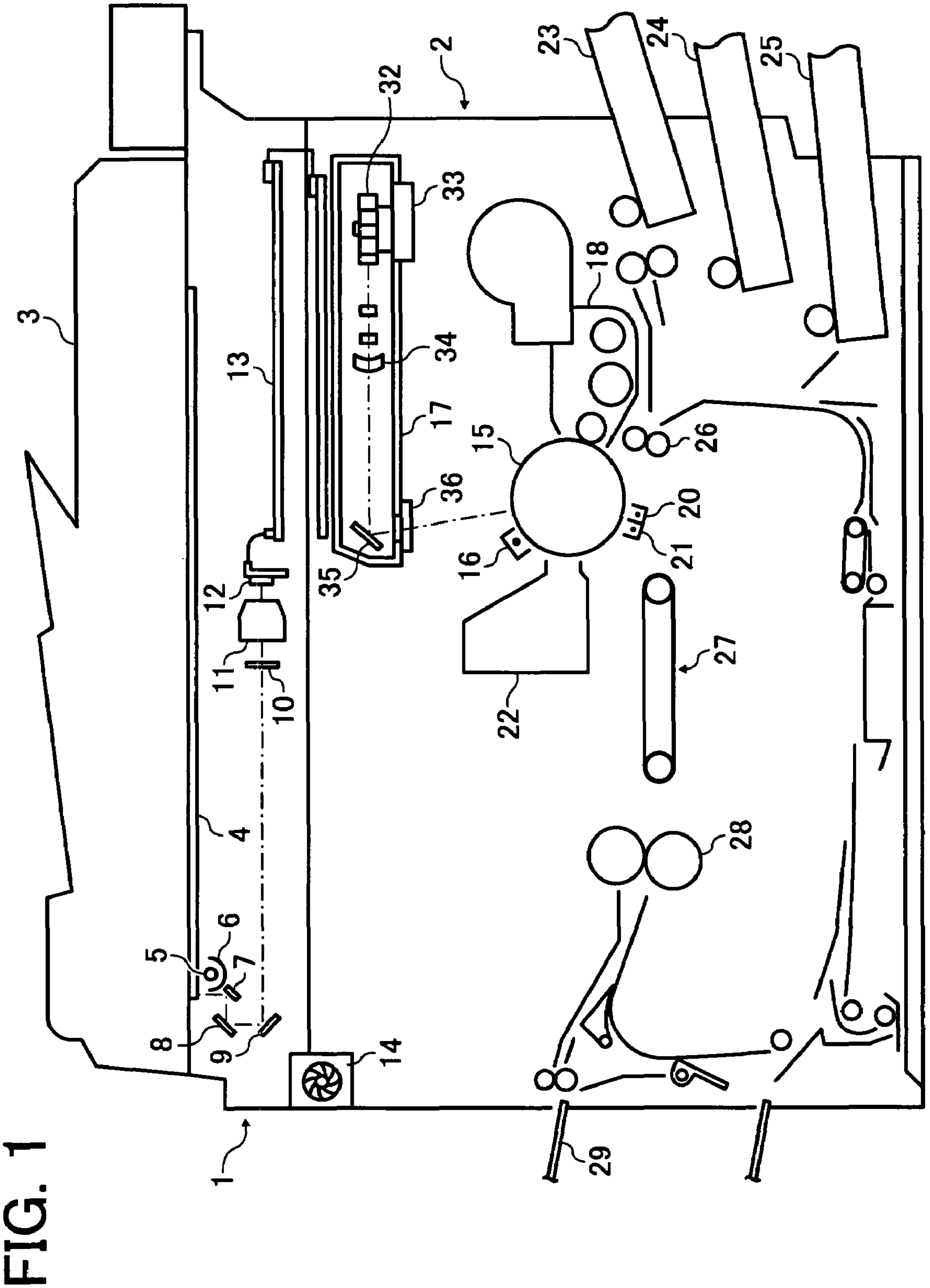
FIG. 1 is a schematic view illustrating a cross-section of the image forming apparatus of an embodiment of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

Embodiments of the present invention provides an optical-scanning apparatus and an image forming apparatus wherein the contamination of polygon mirror can be largely reduced.

FIG. 1 is a schematic view illustrating a cross-section of the image forming apparatus of an embodiment of the present invention.

The image forming apparatus, i.e., a digital copier in FIG. 1 includes an image reader 1, a printer 2 having a laser beam scanner, and an automatic document feeder 3. The document feeder feeds originals to set them on a contact glass 4 one by one, and discharges the originals thereon after duplicated.

Figure 2:
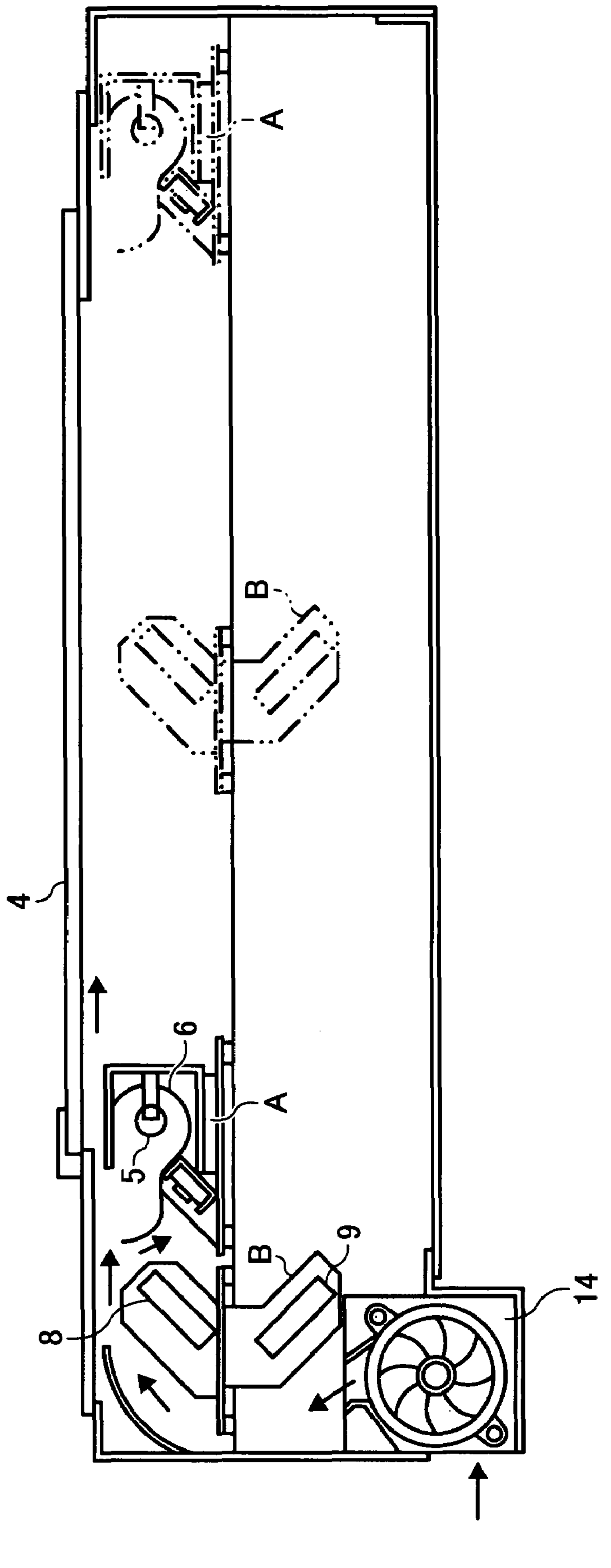
FIG. 2 is an enlarged view illustrating an image reader of the image forming apparatus in FIG. 1.

FIG. 2 is the image reader 1 having a first carriage A including a light source formed of an illumination lamp 5 and a reflector 6, and a first mirror 7, and a second carriage B including a second mirror 8 and a third mirror 9. When an original is read, the first carriage A moves forward at a constant speed, followed by the second carriage B at a half speed of the first carriage A, to optically scan the original. The original on the contact glass 4 is illuminated by the illumination lamp 5 and reflector 6, and a reflected image thereof is focused on a CCD sensor 12 by a lens 11 through the first mirror 7, second mirror 8, third mirror 9 and a color filter 10. The CCD sensor 12 photoelectrically converts the reflected image to produce an analog image signal. After the analog image signal is produced, the first carriage A and second carriage B returns to their original positions.

Being a three-line CCD having a red filter, a green filter and a blue filter, the CCD sensor can read a full-color original. Numeral 14 is a fan internally cooling the image reader 1. The analog image signal from the CCD sensor 12 is converted by an analog/digital converter to a digital image signal, and the digital image signal is subjected to various image processes such as a digitalization process, a multilevel process, a gradation process, a variable power process and an editing process on an image processing board 13.

In the printer 2, a photoreceptor drum 15 as an image bearer is driven to rotate and uniformly charged with a charger 16, and the digital image signal processed with the image processing board 13 is transferred to a semiconductor driving board (not shown). A laser beam scanner 17 as an optical-scanning apparatus irradiates the photoreceptor drum 15 with image wise light based on the digital image signal to form an electrostatic latent image thereon. Then, the electrostatic latent image on the photoreceptor drum 15 is developed by an image developer 18.

A transfer sheet is fed to a registration roller 26 from one of paper feeders 23 to 35, and timely sent out by the registration roller 26 to match a visual image on the photoreceptor drum 15, and which is transferred onto the transfer sheet by a transferer 20. The transfer sheet is separated from the photoreceptor drum 15 by a separator 21, transported by a transporter 27, and discharged on a tray 29 as a duplicate after the visual image is fixed thereon. The photoreceptor drum 15 is cleaned by a cleaner 22 to remove a toner remaining thereon after the transfer sheet is separated therefrom.

Figure 3:
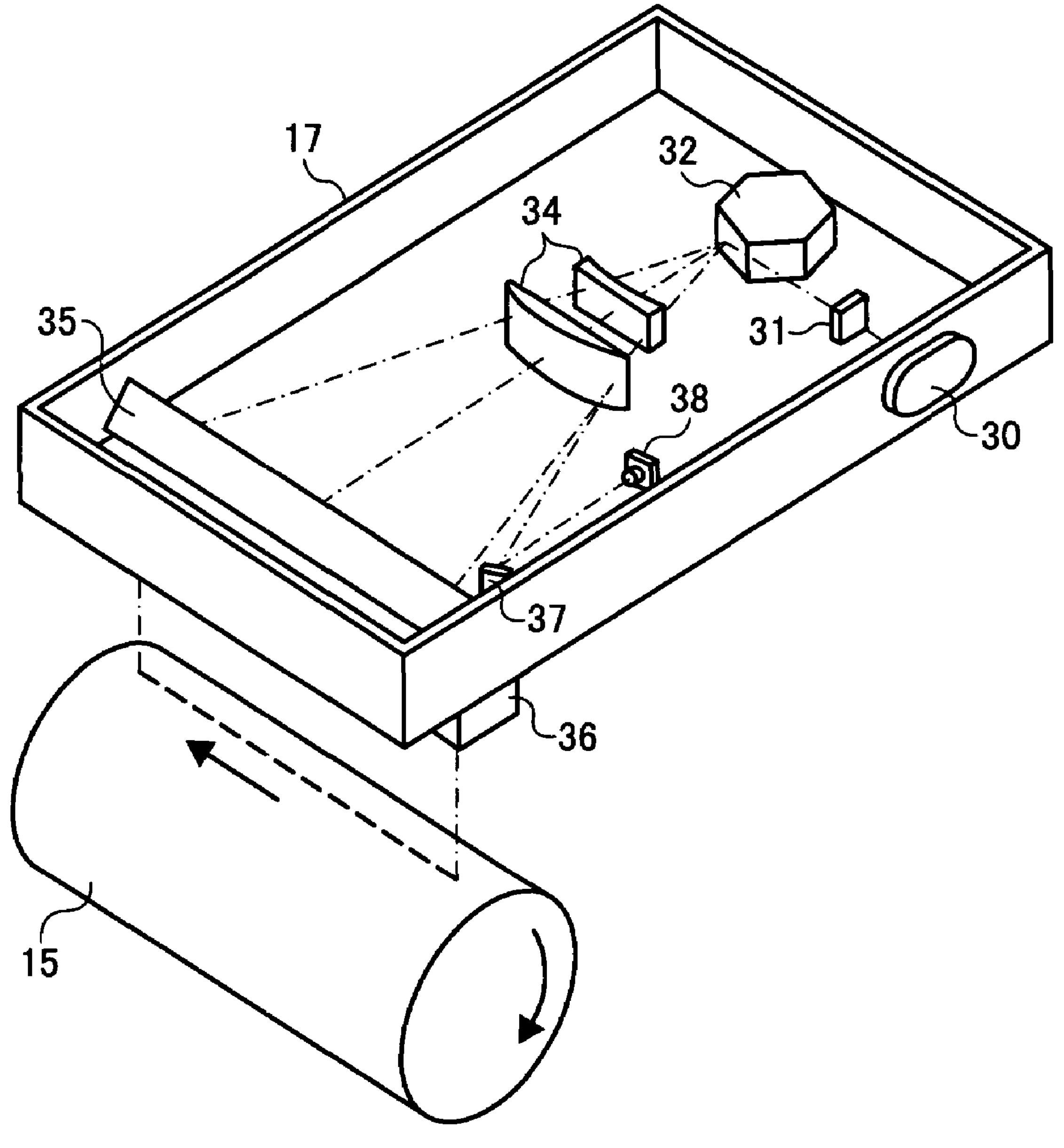
FIG. 3 is a perspective view illustrating a laser beam scanner of the image forming apparatus.

The laser beam scanner 17 includes, as FIG. 3 shows, a semiconductor laser unit 30, a cylindrical lens 31, a polygon mirror 32, a fθ lens 34, a reflector 35 and a dust-proof glass 36 in an optical housing, and the top of which is covered by a cover 41 such that the optical housing is almost sealed.

In the laser beam scanner 17, a laser beam emitted from a semiconductor laser in the semiconductor laser unit 30 is changed to a parallel flux through a collimated lens therein, and the parallel flux is passed through an aperture therein to have a specific shape. The flux is compressed in the vertical scanning direction through the cylindrical lens 31, and falls on the polygon mirror 32. The polygon mirror 32 has the shape of a regular polygon and is unidirectionally rotated at a constant speed by a polygon motor 33. The rotation speed of the polygon mirror 32 depends on the rotation speed of the photoreceptor drum 15, the writing density of the laser beam scanner 17 and the number of faces of the polygon mirror 32.

The laser beam fallen on the polygon mirror 32 from the cylindrical lens 31 is deflected by a reflecting surface of the polygon mirror 32, and fallen on the fθ lens 34. The fθ lens 34 converts scanning light having a constant angular speed from the polygon mirror 32 so as to be scanned at a constant speed on the photoreceptor drum 15, and the laser beam from the fθ lens 34 is focused on the photoreceptor drum 15 through the reflector 35 and dust-proof glass 36. The fθ lens 34 also has a capability of adjusting a deviation of optical plane. The laser beam passed through the fθ lens 34 is reflected by synchro detection mirror 37 outside an image area and led to a synchro detection sensor 38. Then, the synchro detection sensor 38*a* produces a synchro signal which is a cue standard of the main scanning direction.

The laser beam scanner 17 includes many optical parts having optical capabilities which noticeably deteriorate when particulate materials in the air adhere thereto. Particularly, particulate materials included in the air in the optical unit tend to adhere to the polygon mirror 32 rotating at a high speed. Not simply the reflectance thereof deteriorates, but the reflectance in the main scanning direction mostly deteriorates because the rotation direction mostly conforms thereto, resulting in uneven image density.

This problem can be reduced by an electrostatic absorption filter collecting powder dusts and particulate materials. The electrostatic absorption filter is formed of a fibrous member, and the dust collectability thereof can be increased when becoming more short-chained because of being highly-charged. However, when a highly-charged electrostatic absorption filter is used to efficiently collect dusts, a fibrous member forming the filter more possibly drops due to air stream, gravity, vibration, etc. When the fibrous member drops, scatters and adheres to lenses in the optical-scanning apparatus, the resultant images are seriously deteriorated.

Figure 4A:
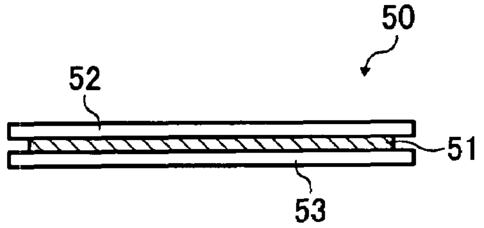
FIG. 4A is a front view illustrating a constitution of the collection member of an embodiment of the present invention.

FIG. 4A is a front view illustrating a constitution of the collection member of an embodiment of the present invention.

The collection member 50 has a structure combining plural sheet-shaped members each including a highly-chargeable electrostatic absorption filter 51 to collect particulate materials. The highly-chargeable electrostatic absorption filter 51 is sandwiched by two pieces of breathable antiscattering sheets 52 and 53, which prevents the fibrous member of the highly-chargeable electrostatic absorption filter 51 from scattering due to air stream, gravity, vibration, etc.

Next, other embodiments of the collection member 50 will be explained, referring to FIGS. 5, 6A, 6B, 7A and 7B.

Figure 5:
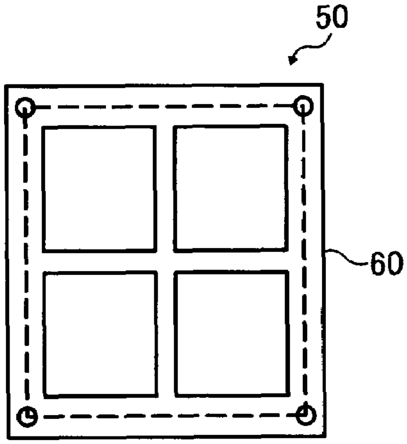
FIG. 5 is a plain view illustrating an embodiment of the collection member of the present invention.

A collection member 50 in FIG. 5 has a constitution formed by casting plural sheets and a frame 60. Namely, the collection member 50 has a constitution formed by casting a highly-chargeable electrostatic absorption filter 51 sandwiched by two pieces of breathable antiscattering sheets 52 and 53 and the frame 60. Therefore, the antiscattering sheets 52 and 53 prevent the fibrous member of the highly-chargeable electrostatic absorption filter 51 in the collection member 50 from scattering.

Such a collection member 50 is detachable from an optical housing through the frame 60, which costs less than the collection member wherein a frame is placed on sheets afterwards.

Figure 6A:
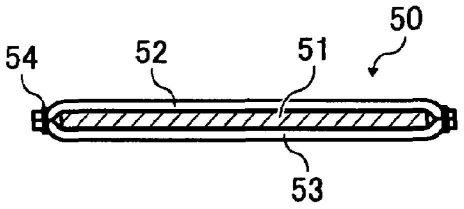
FIGS. 6A and 6B are a sectional view and a plain view of another embodiment of the collection member of the present invention, respectively.
Figure 6B:
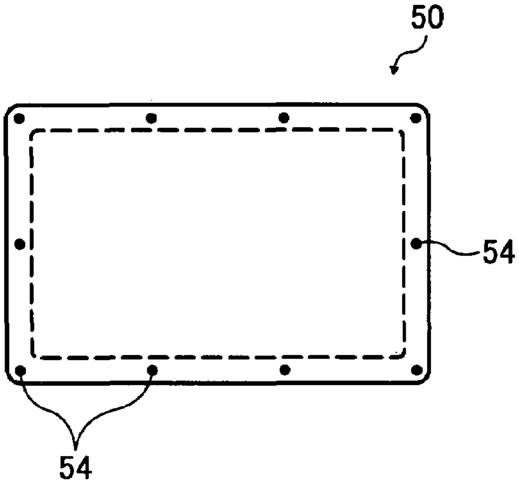

A collection member 50 in FIGS. 6A and 6B has a constitution formed by fastening several places 54 of the circumference of a highly-chargeable electrostatic absorption filter 51 sandwiched by two pieces of breathable sheets 52 and 53. The fastening method includes methods of welding or physically pressurizing such as caulking. Further, methods of using other members such as a stapler, a grommet, a rivet and a clip can also be used, and which depend on the shape and material of the collection member 50, methods of setting the laser beam scanner 17 in the optical housing, etc.

Figure 7A:
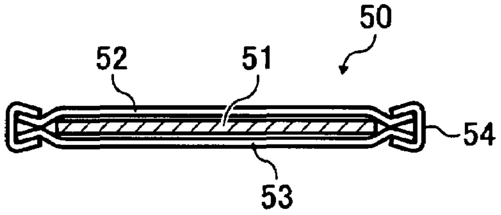
FIGS. 7A and 7B are a sectional view and a plain view of a further embodiment of the collection member of the present invention, respectively.
Figure 7B:
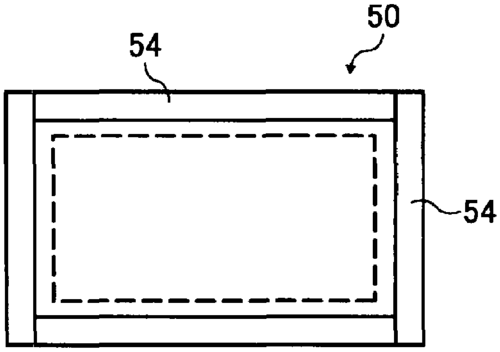

A collection member 50 in FIGS. 7A and 7B also has a constitution formed by fastening several places 54 of the circumference of a highly-chargeable electrostatic absorption filter 51 sandwiched by two pieces of breathable sheets 52 and 53. The fastening methods used in for the collection member 50 in FIGS. 6A and 6B can be used, however, the collection member 50 in FIGS. 7A and 7B differs therefrom in that the circumference is wholly fastened. Namely, the whole circumference 54 is fastened.

Any sheets can be used for the sheets 52 and 53 if breathable, sheet-shaped and capable of preventing the fibrous member of the highly-chargeable electrostatic absorption filter 51 from scattering. However, the sheets 52 and 53 are preferably meshed materials having good breathability. The sheets 52 and 53 may be electrostatic absorption filters having lower chargeability than the highly-chargeable electrostatic absorption filter 51. Typically, most of the highly-chargeable electrostatic absorption filters include shot-chained fibers, and which tend to drop, fall and scatter due to external forces. Meanwhile, the low-chargeable electrostatic absorption filter not including such a shot-chained fiber can sufficiently be used as an antiscattering sheet. In addition, the low-chargeable electrostatic absorption filter can trap particulate materials in the air although less than the highly-chargeable electrostatic absorption filter 51.

Next, the location of the collection member 50 in the optical housing will be explained.

The electrostatic absorption filter is typically used with a fan and a duct, and collects dusts included in a gas passing the filter, and further collects particulate materials with static electricity. In an embodiment of the present invention, a fan or a duct is not used and the air from an airstream caused by the rotation of the polygon mirror 32 does not pass the collection member much. However, the highly-chargeable electrostatic absorption filter 51 can collect particulate materials in the optical housing without a fan or a duct. Therefore, the collection member 50 can trap particulate materials anywhere in the optical housing.

Figure 10:
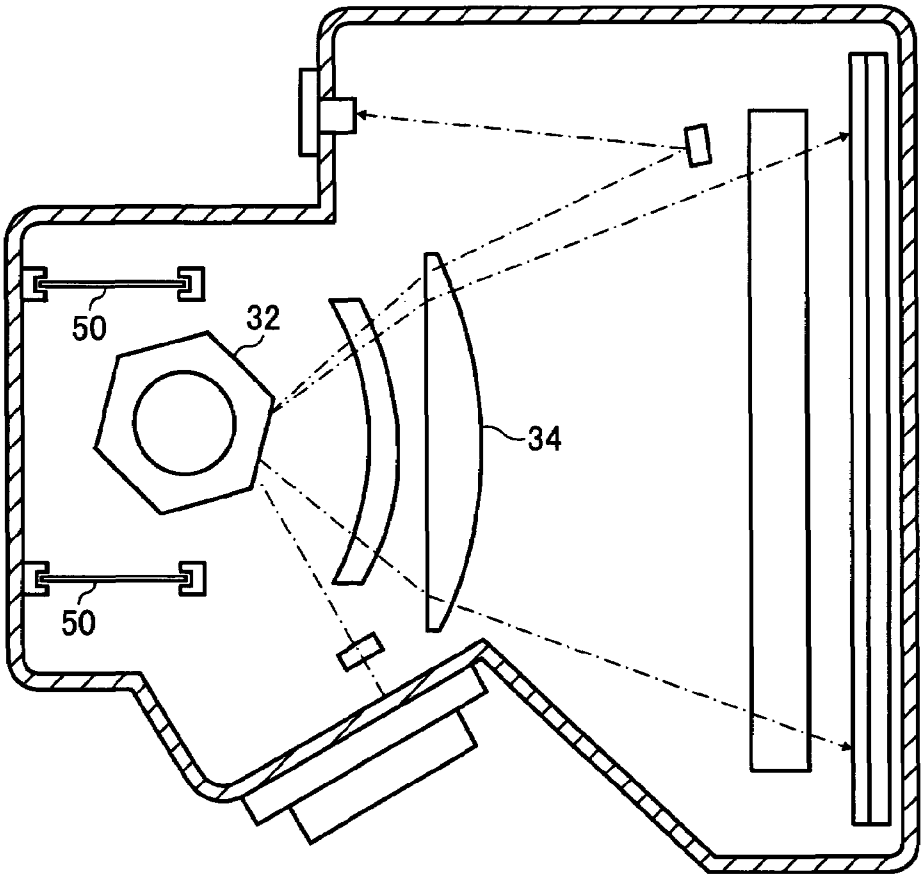
FIG. 10 is a plain view illustrating an embodiment of locating the collection member in FIG. 4A of the present invention.

The collection member 50 is preferably located close to the polygon mirror 32 to more efficiently prevent contamination thereof. Particularly, as shown in FIG. 10, when the collection member 50 is located facing the mirror of the polygon mirror 32, the airstream caused by the rotation thereof directly hits the collection member 50, and therefore particulate materials can efficiently be collected.

Figure 11:
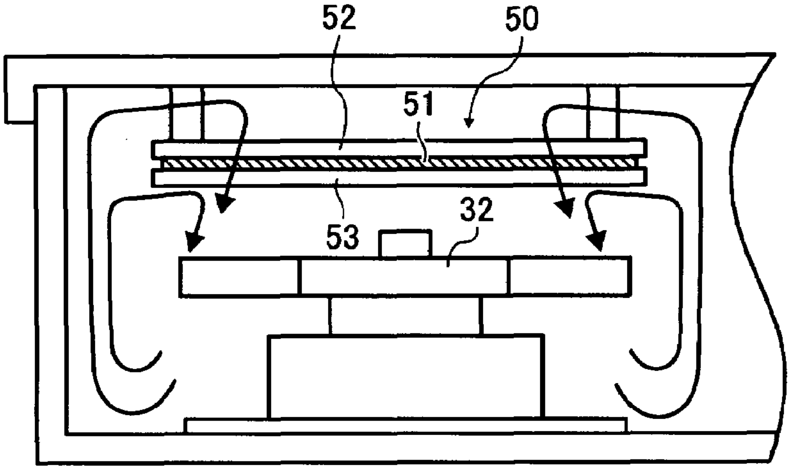
FIG. 11 is a sectional view illustrating another embodiment of locating the collection member in FIG. 4A of the present invention.

The collection member 50 may even be located above the polygon mirror 32 as shown in FIG. 11, which also effectively collects particulate materials to prevent contamination of the polygon mirror 32.

Figure 14:
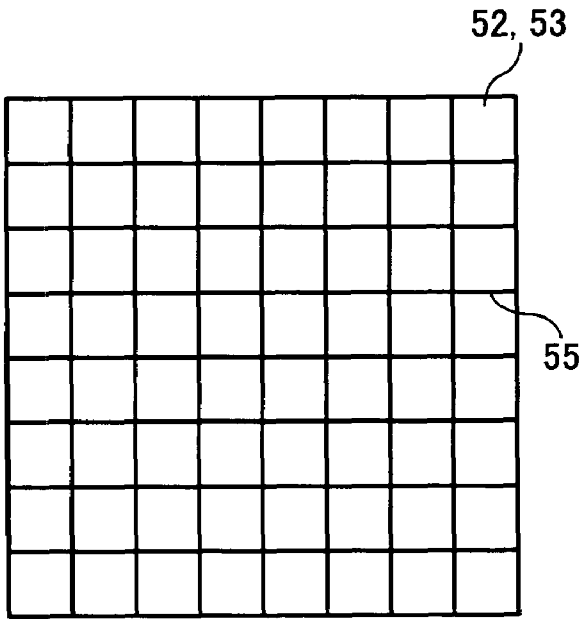
FIG. 14 is a plain view illustrating a further embodiment of the collection member of the present invention.
Figure 15:
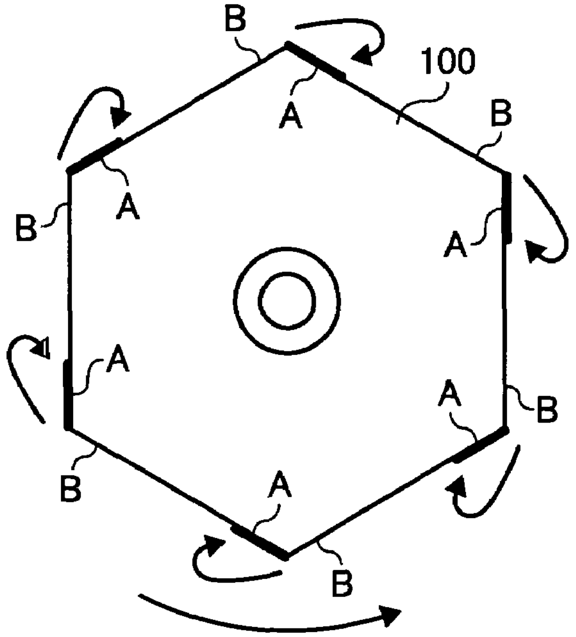
FIG. 15 is a plain view illustrating a polygon mirror in the image forming apparatus of an embodiment of the present invention.

FIG. 14 is a collection member including sheets 52 and 53 which are both electrostatic absorption filters and antiscattering sheets, and a net-shaped member 55 reinforcing the sheets 52 and 53. The net-shaped member 55 is combined with the sheets 52 and 53 to reinforce them and prevent members forming the sheet such as a fibrous member from dropping, falling and scattering due to external forces. Therefore, handling the filter becomes easier, the choice of the antiscattering sheets increases and the design of the collection member becomes simpler.

In FIG. 14, since the net-shaped member 55 covers one side of the sheet 52 or 53, the backside of the sheet 53 where a member forming the collection member tends to scatter due to gravity, airstream, vibration, etc. is covered thereby.

Figure 4B:
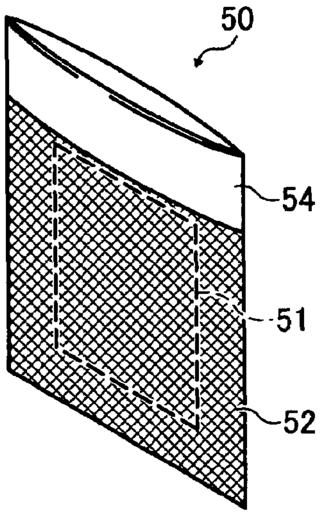
FIG. 4B is a perspective view illustrating another constitution of the collection member of an embodiment of the present invention.

FIG. 4B is a perspective view illustrating another constitution of the collection member 50 of an embodiment of the present invention, which contains a highly-chargeable electrostatic absorption filter 51 collecting particulate materials in a bag-shaped member 52. The bag-shaped member 52 is a nonwoven cloth formed of a chemical fiber made of polypropylene in FIG. 4B, however, may be other nonwoven clothes formed of chemical fibers such as polyethylene and rayon, and may be coarse-textured clothes formed of biological materials such as paper, cotton and silk as used for tea-bags. It is essential that the bag-shaped member 52 does not drop a fiber of the highly-chargeable electrostatic absorption filter 51 in an optical-scanning apparatus and has a mesh size so as to pass the particulate materials to be collected.

The highly-chargeable electrostatic absorption filter 51 is placed in the bag-shaped member 52 through an opening thereof, and the opening thereof is closed to form the collection member 50. The opening of the bag-shaped member 52 is typically closed with an adhesive, and may be closed with other members such as a stapler and a clip. Any of these methods take time and cost as much.

Figure 8:
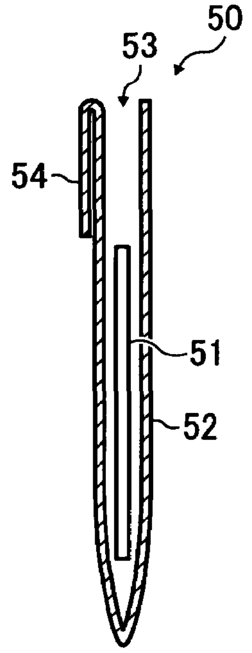
FIG. 8 is a sectional view illustrating the collection member in FIG. 4B of an embodiment of the present invention, opening its opening mouth.

FIG. 8 is the collection member 50, the opening of which is easily closable without using fastening members such as an adhesive and a stapler.

The bag-shaped member 52 in FIG. 8 is made of a large-mesh paper as used for tea-bags, which has an opening 53 through which the electrostatic absorption filter 51 is placed therein. The bag-shaped member 52 also has a turnback 54 like a pocket, having the same width of the bag-shaped member 52 and a side fixed on a side thereof.

Figure 9:
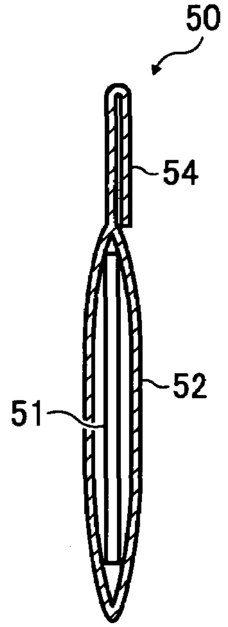
FIG. 9 is a sectional view illustrating the collection member in FIG. 4B of an embodiment of the present invention, closing its mouth.

As shown in FIG. 9, the turnback 54 can easily be turned back after the electrostatic absorption filter 51 is placed in the bag-shaped member 52 because of being made of a flexible material such as a paper, and which covers the opening 53 to close the bag-shaped member 52. Therefore, the opening 53 can be closed without using an adhesive or a stapler, and falling of a fiber from the electrostatic absorption filter 51 can be prevented. The turnback 54 is reopened to exchange the electrostatic absorption filter 51.

Figure 12:
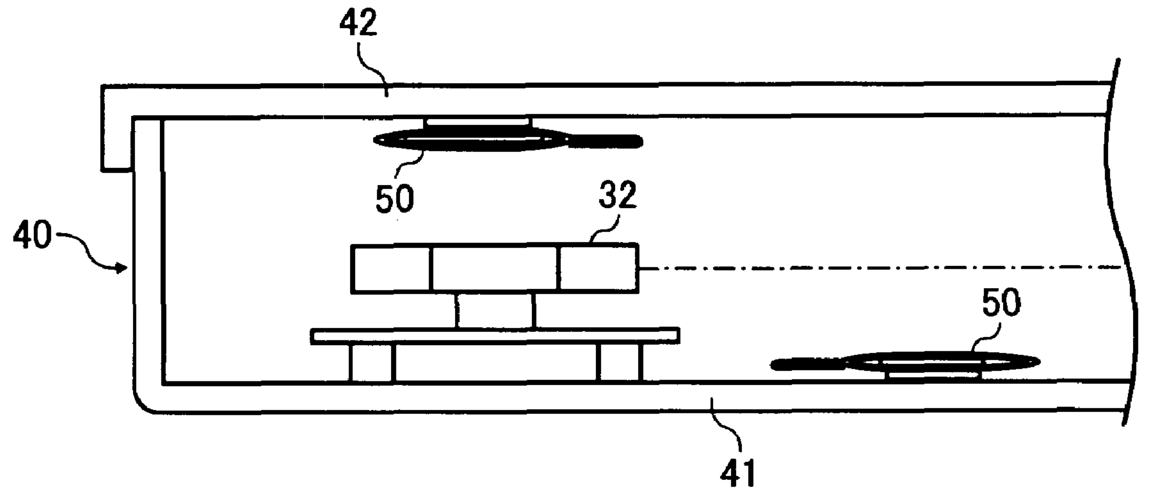
FIG. 12 is a sectional view illustrating an embodiment of locating the collection member in FIG. 4B of the present invention.

Next, the location of, and a method of locating the collection member 50 in the optical housing will be explained. Since the optical housing includes an almost sealed space, the collection member 50 can effectively be located anywhere therein. The collection member 50 is preferably located close to the polygon mirror 32 to more efficiently prevent contamination thereof. Including the electrostatic absorption filter 51 in the bag-shaped member 52, the collection member 50 can be pasted on any place of a chassis 41 of the optical housing 40 as shown in FIG. 12. In addition, the collection member 50 can be pasted on a cover 42 of the optical housing 40 as shown in FIG. 12.

The collection member 50 including the electrostatic absorption filter 51 is more effectively used when the electrostatic absorption filter 51 has a larger collection area exposed to air. Therefore, when the bag-shaped member 52 is pasted on the chassis 41 or on the cover 42, there is no space therebetween, resulting in deterioration of collectability.

Figure 13:
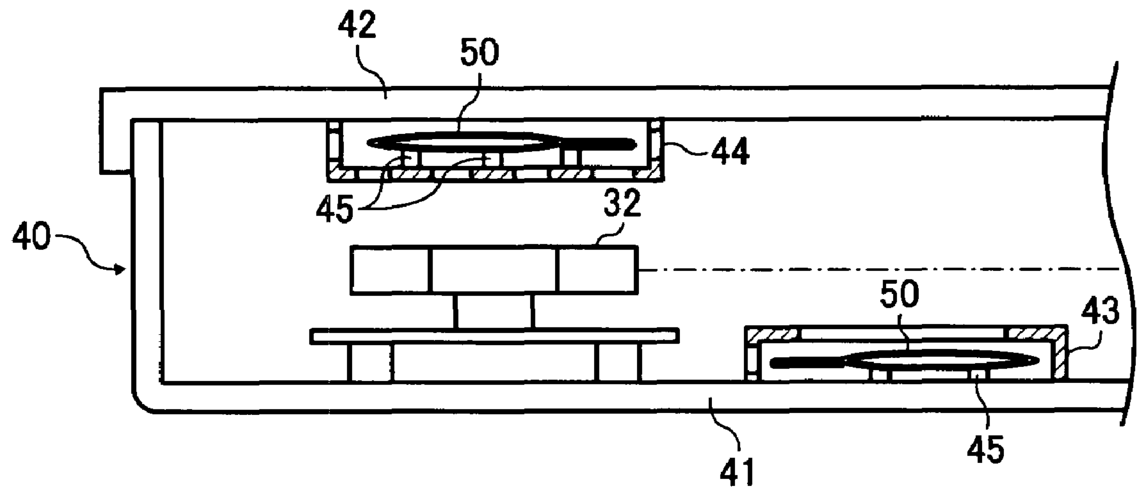
FIG. 13 is a sectional view illustrating another embodiment of locating the collection member in FIG. 4B of the present invention.

As shown in FIG. 13, holders 43 and 44 are located on the chassis 41 and/or the cover 42 of the optical housing 40, which each includes the collection member 50 to limit movement thereof. Further, the holders 43 and 43 each has projections 45 on which the collection member 50 is located such that a space is formed between the collection member 50 and the chassis 41 and/or the cover 42. Therefore, the collection area exposed to air of the electrostatic absorption filter 51 increases and particulate materials are more efficiently collected.

Having now fully described the invention, it will be apparent to one of ordinary skill in the art that many changes and modifications can be made thereto without departing from the spirit and scope of the invention as set forth therein.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed as new and desired to be secured by Letters Patent of the United States is:

1. An image forming apparatus, comprising:

an image bearer on which an electrostatic latent image is formable;

an optical-scanning apparatus to irradiate the image bearer with light based on a digital image signal, to form an electrostatic latent image thereon;

an image developer to develop the image on the image bearer;

a transferer to transfer the image onto a transfer sheet, the optical-scanning apparatus including, a light deflector to deflect a beam from a light source; and an optical housing including a scanning-image optical system to focus the beam to scan a photoconductive photoreceptor therewith as a light spot, and a collection member to collect particulate materials, and the collection member including structure at least one of combining and overlapping plural sheet-shaped members, each including a highly-chargeable electrostatic absorption filter.

2. The image forming apparatus of claim 1, wherein the collection member includes a structure at least one of combining and overlapping the highly-chargeable electrostatic absorption filter and a breathable antiscattering sheet.

3. The image forming apparatus of claim 2, wherein the highly-chargeable electrostatic absorption filter includes two sides covered with the breathable antiscattering sheet.

4. The image forming apparatus of claim 3, wherein the breathable antiscattering sheet includes a circumference locally fastened.

5. The image forming apparatus of claim 3, wherein the breathable antiscattering sheet includes a circumference wholly fastened.

6. The image forming apparatus of claim 2, wherein the breathable antiscattering sheet is an electrostatic absorption filter charged less than the highly-chargeable electrostatic absorption filter.

7. The image forming apparatus of claim 2, wherein the breathable antiscattering sheet is a porous mesh.

8. The image forming apparatus of claim 2, wherein the breathable antiscattering sheet includes a side reinforced with a net.

9. The image forming apparatus of claim 8, wherein the net is located on a side of the breathable antiscattering sheet facing toward the optical-scanning apparatus.

10. An image forming apparatus, comprising:

an image bearer on which an electrostatic latent image is formable;

an optical-scanning apparatus to irradiate the image bearer with light based on a digital image signal to form an electrostatic latent image thereon;

an image developer to develop an image on the image bearer;

a transferer to transfer the image onto a transfer sheet, the optical-scanning apparatus including, a light deflector configured to deflect a beam from a light source, and an optical housing including, a scanning-image optical system to focus the beam to scan a photoconductive photoreceptor therewith as a light spot, and a collection member to collect particulate materials, the collection member including, an electrostatic absorption filter, and a breathable sheet-shaped member to cover almost all the surface of the electrostatic absorption filter.

11. The image forming apparatus of claim 10, wherein the electrostatic absorption filter is contained in a bag-shaped member formed of a breathable sheet material.

12. The image forming apparatus of claim 10, wherein the electrostatic absorption filter is a highly-chargeable electrostatic absorption filter including a short-chained fibrous member.

13. The image forming apparatus of claim 11, wherein the bag-shaped member is formed of a sheet material made of a chemical fiber.

14. The image forming apparatus of claim 11, wherein the bag-shaped member is formed of a sheet material made of a biological fiber.

15. The image forming apparatus of claim 11, wherein the bag-shaped member includes an opening and a turnback, and wherein the turnback closes the opening.

16. The image forming apparatus of claim 11, wherein the bag-shaped member containing the electrostatic absorption filter is pasted on a chassis of the optical housing close to the polygon mirror.

17. The image forming apparatus of claim 11, wherein the bag-shaped member containing the electrostatic absorption filter is pasted on a cover of the optical housing close to the polygon mirror.

18. The image forming apparatus of claim 16, wherein the bag-shaped member containing the electrostatic absorption filter is located on a projection so as to have a space between the bag-shaped member and the chassis.

19. The image forming apparatus of claim 17, wherein the bag-shaped member containing the electrostatic absorption filter is located in a holder so as to include a space between the bag-shaped member and the cover.

20. An optical-scanning apparatus for use in an image forming apparatus, comprising:

a light deflector to deflect a beam from a light source; and an optical housing, the optical housing including a scanning-image optical system to focus a beam to scan a photoconductive photoreceptor therewith as a light spot, and a collection member to collect particulate materials, the collection member further including structure at least one of combining and overlapping plural sheet-shaped members, each including a highly-chargeable electrostatic absorption filter.

* * * * *